United States Patent [19]

Nagasawa et al.

[11] Patent Number: 4,645,983
[45] Date of Patent: Feb. 24, 1987

[54] IMAGE TUBE CIRCUIT

[75] Inventors: Tomonori Nagasawa; Hisashi Ushijima, both of Kanagawa, Japan

[73] Assignee: Sony Corporation, Tokyo, Japan

[21] Appl. No.: 790,977

[22] Filed: Oct. 24, 1985

[30] Foreign Application Priority Data

Nov. 29, 1984 [JP] Japan .................................. 59-252140

[51] Int. Cl.$^4$ ............................................. H01J 29/56
[52] U.S. Cl. ..................................... 315/370; 358/217
[58] Field of Search ....................... 315/408, 410, 370; 358/217, 223

[56] References Cited

U.S. PATENT DOCUMENTS 4,439,713 3/1984 Nakamura et al. .................. 358/217

Primary Examiner—Theodore M. Blum
Attorney, Agent, or Firm—Lewis H. Eslinger; Alvin Sinderbrand

[57] ABSTRACT

An apparatus for controlling the deflection of an electron beam in an image pick-up tube of the type including a target screen, an electron gun for generating the electron beam, and a deflection device for causing the generated electron to scan the target screen includes a circuit for generating a saw-tooth signal having a first portion for causing the beam to scan a raster or effective image area on the target screen at a first scan velocity and a second portion for causing the beam to scan an over-scan area on the target screen outside of the raster image area at a second scan velocity faster than the first scan velocity, a circuit for changing the average level of the second portion of the saw-tooth signal relative to that of the first portion of said saw-tooth signal, and a circuit for supplying the output of the level changing circuit to the deflection device so that the electron beam is defocused on the over-scan area of the target screen for fully scanning such over-scan area.

6 Claims, 12 Drawing Figures

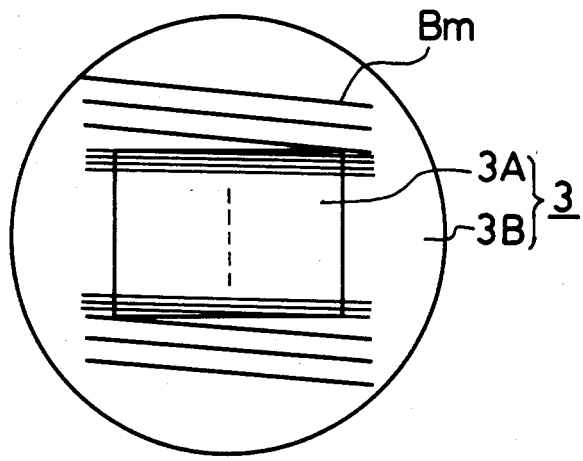
FIG. 3
PRIOR ART
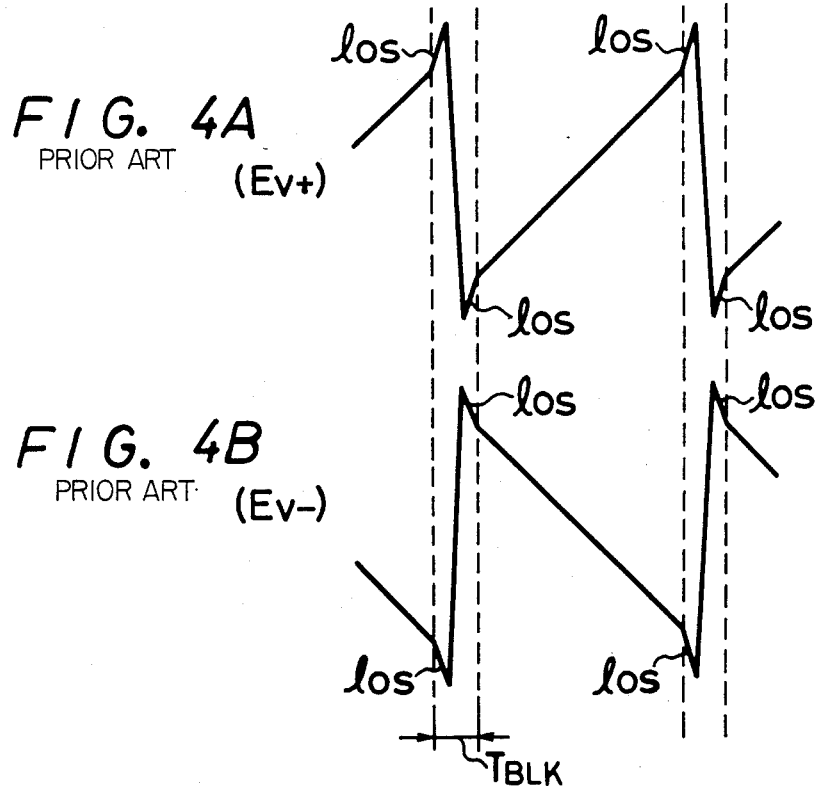
FIG. 4A
PRIOR ART (Ev+)
FIG. 4B
PRIOR ART (Ev-)

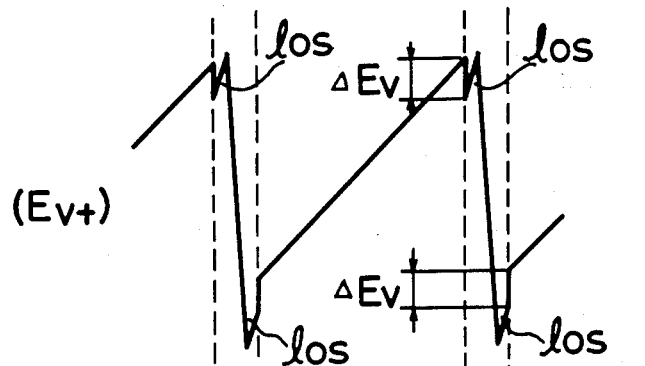
FIG. 6A (Ev+)
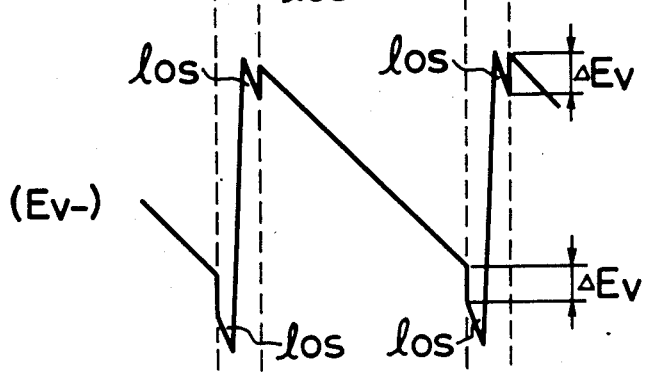
FIG. 6B (Ev−)
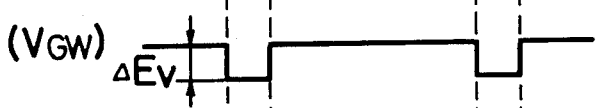
FIG. 6C (VGW)
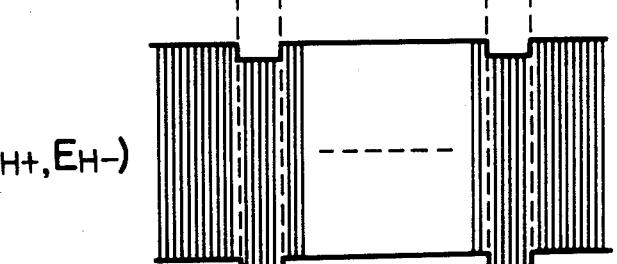
FIG. 6D (EH+, EH−)
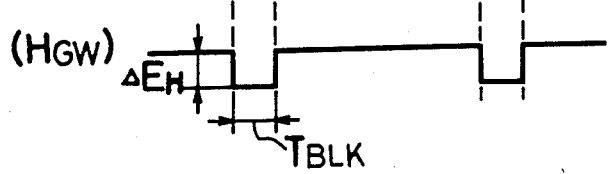
FIG. 6E (HGW)

IMAGE TUBE CIRCUIT

BACKGROUND OF THE INVENTION

1. Field of the Invention

This invention relates generally to an image pick-up tube and, more particularly, is directed to an apparatus for controlling the deflection of an electron beam in an image pick-up tube.

2. Description of the Prior Art

FIG. 1 is a diagram showing an example of a prior art image pick-up tube of electromagnetic focusing and electrostatic deflection type. In FIG. 1, reference numeral 1 designates a glass bulb, 2 a face plate, 3 a target plate or screen (photoelectric conversion screen), 4 an indium ring for cool-sealing, and 5 a metal ring. Reference numeral 6 designates a metal electrode which is inserted through the face plate 2 so as to contact the target screen 3 for drawing out a signal therefrom.

Reference letters K, $G_1$ and $G_2$ designate a cathode, a first grid and a second grid, respectively, which constitute an electron gun. In this case, reference letter LA designates a beam limiting aperture which limits the divergence angle of an electron beam Bm supplied to the target screen 3 from the electron gun.

Reference letter $G_3$ designates a third grid electrode which forms a deflection electrode. This third electrode grid $G_3$ is formed of a metal, such as chromium, which is deposited by vacuum evaporation or plated on the inner surface of the glass bulb 1 and then cut in a predetermined pattern by, for example, a laser beam. In this case, in order to produce a uniform deflection electric field, the third grid electrode $G_3$ is formed as a so-called arrow pattern as shown in the developed view of FIG. 2. In FIG. 2, reference letters V+ and V− designate vertical deflection electrodes, respectively, to which saw-tooth wave voltages $E_{V+}$ and $E_{V-}$ of the vertical period changing symmetrically around a predetermined voltage are applied. Further, in FIG. 2, reference letters H+ and H− respectively designate horizontal deflection electrodes to which saw-tooth wave voltages $E_{H+}$ and $E_{H-}$ of the horizontal period changing symmetrically around a predetermined voltage are applied. Thus, the vertical and horizontal deflection scannings are carried out.

Turning back to FIG. 1, reference letter $G_4$ designates a mesh-shaped electrode which is supported on a mesh holder 7. Reference numeral 8 designates a focusing coil and reference numeral 9 designates a stem pin.

In such image pick-up tube, most of the electron beam Bm emitted from the electron gun is absorbed by the target screen 3, the mesh electrode 4 and the like. However, there is a case where a part of the electron beam Bm returns to the electron gun, reflected thereon, accelerated again and then reaches to the target screen 3. When such electron beam is landed on a so-called over-scan area 3B (FIG. 3) of the target screen 3, a false signal caused by this secondary beam reflection is generated. Particularly when the potential at the over-scan area 3B is different from that at the effective image area 3A, the possibility that the secondary-reflected beam will land on the over-scan area becomes high. Furthermore, in such image pick-up tube, the effective image area 3A and the over-scan area 3B of the target screen 3 as shown in FIG. 3 are different in potential so that a so-called framing is caused thereby. In other words, the potential is disturbed around the periphery of the effective image area 3A and a shadow just like a frame one occurs.

Therefore, in order to avoid the generation of the false signal caused by the secondary beam reflection, the following methods are proposed: first a transparent electrode is formed only on the necessary portion of the target screen 3; second the area of the mesh-shaped electrode $G_4$ is decreased, or a so-called mesh angle is made small so that the beam can be prevented from being landed on the target screen 3 except the effective image area; and third the electron gun is formed so as to avoid the generation of the false signal caused by the secondary beam reflection. However, in accordance with the first method, the area of the transparent electrode can not be reduced so much because of problems, such as accuracy of the centering and so on; in accordance with the second method, the area of the mesh-shaped electrode can not be reduced so much because if the area of the mesh-shaped electrode is reduced, the electric field is disturbed and, as a result, mis-landing of the electron beam will be caused; and in accordance with the third method, the electron gun of satisfactory construction has not yet been produced and further, such previously proposed methods can not avoid the generation of the false signal caused by the secondary beam reflection completely.

As disclosed in U.S. Pat. No. 4,439,713 having a common assignee herewith, in order to avoid the occurrence of framing, it has been previously proposed that the target screen 3 be scanned by the electron beam Bm at the over-scan area 3B formed near the periphery of the effective image area 3A, or that the so-called over-scan be carried out. According to this over-scan, the charge accumulated in the over-scan area 3B near the periphery of the effective image area 3A is discharged and thereby a potential difference between the peripheral over-scan area 3B and the effective image area 3A can be removed so that it is possible to avoid the framing caused by the potential difference between the over-scan area 3B and the effective image area 3A. Further it is proposed that the velocity of the electron beam Bm is made high in this over-scan portion and hence the electron beam Bm can over-scan the long distance within a short duration of time. More particularly, the saw-tooth wave voltages $E_{V+}$ and $E_{V-}$ for vertical deflection are formed to have waveforms as shown in FIGS. 4A and 4B, each of which has a steep inclination in an over-scan portion los. In FIGS. 4A and 4B, $T_{BLK}$ represents the vertical blanking period. Saw-tooth wave voltages $E_{H+}$ and $E_{H-}$ for horizontal deflection are formed to have over-scan waveforms similar to the saw-tooth wave voltages $E_{V+}$ and $E_{V-}$ though not shown.

It is to be noted that even though the reflected electron beam exists, if it is not landed on the over-scan area 3B of the target screen 3, the false signal caused by the secondary beam reflection is not generated. It is possible to reduce the possibility that the secondary beam reflection will be landed on the over-scan area 3B by making the potential of the over-scan area 3B equal to that of the effective image area 3A. Thus, the over-scan method is effective for reducing the generation of the false signal caused by the secondary beam reflection.

However, according to the above-described over-scan method, as shown by the scanning loci thereof in FIG. 3, the scanning of the over-scan area 3B, for example, in the vertical direction, gets very rough, and the area which cannot be scanned is considerable with the result that the potential thereof is not lowered sufficiently so that the avoidance of the generation of the false signal by the over-scan method cannot be fully achieved. In other words, there are spaces or gaps between the successive scans by the focused beam on the over-scan area, so that the potential is not adequately reduced at such spaces or gaps.

OBJECTS AND SUMMARY OF THE INVENTION

Accordingly, it is an object of this invention to provide an apparatus for controlling the deflection of an electron beam in an image pick-up tube that avoids the above-described difficulties encountered with the prior art.

Another object of this invention is to provide an apparatus for controlling the deflection of an electron beam in an image pick-up tube that avoids the occurrence of the framing around the effective image area.

A further object of this invention is to provide an apparatus for controlling the deflection of an electron beam in an image pick-up tube that avoids the generation of a false signal caused by the secondary beam reflection.

According to one aspect of the present invention, there is provided an apparatus for controlling the deflection of an electron beam in an image pick-up tube of the type including target means, means for generating the electron beam, and deflection means for causing the generated electron beam to scan said target means, said apparatus comprising:

(a) means for generating a saw-tooth signal having a first portion for causing said beam to scan a raster image area on said target means at a first scan velocity and a second portion for causing said beam to scan an over-scan area on said target means outside of said raster image area at a second scan velocity faster than said first scan velocity;

(b) means for changing the average level of the second portion of said saw-tooth signal relative to that of the first portion of said saw-tooth signal; and (c) means for supplying the output of said changing means to said deflection means whereby the electron beam on said over-scan area of said target means is defocused.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 3 is a diagram showing scanning loci of an electron beam used in the prior art example;

FIGS. 4A and 4B are respectively waveform diagrams of deflection voltages used in the prior art example;

FIGS. 6A to 6E are respectively waveform diagrams to which reference will be made in explaining the operation of an embodiment of this invention.

DESCRIPTION OF THE PREFERRED EMBODIMENT

Now, an embodiment of an apparatus for controlling the deflection of an electron beam in an image pick-up tube according to the present invention will hereinafter be described with reference to the drawings. In this embodiment, the apparatus of the invention is applied to an image pick-up tube of an electromagnetic focusing and electrostatic deflection type.

In this embodiment, in which the scanning velocity of the electron beam is increased during the vertical blanking period to thereby carry out the over-scan operation as described above, during the vertical blanking period $T_{BLK}$ the electron beam Bm is defocused on the target screen 3.

FIGS. 6A and 6B respectively illustrate the saw-tooth voltages $E_{V+}$ and $E_{V-}$ for use in effecting vertical deflection in this embodiment. In FIGS. 6A and 6B, los designates an over-scan portion. In accordance with this embodiment, as compared with the saw-tooth wave voltages $E_{V+}$ and $E_{V-}$ (shown in FIGS. 4A and 4B) used in the prior art, during the vertical blanking period $T_{BLK}$, its average value $V_{GW}$ is lowered by a predetermined value $\Delta E_V$ (shown in FIG. 6C). Such saw-tooth wave voltages $E_{V+}$ and $E_{V-}$ are generated by a circuit as, for example, shown in FIG. 7.

Figure 7:
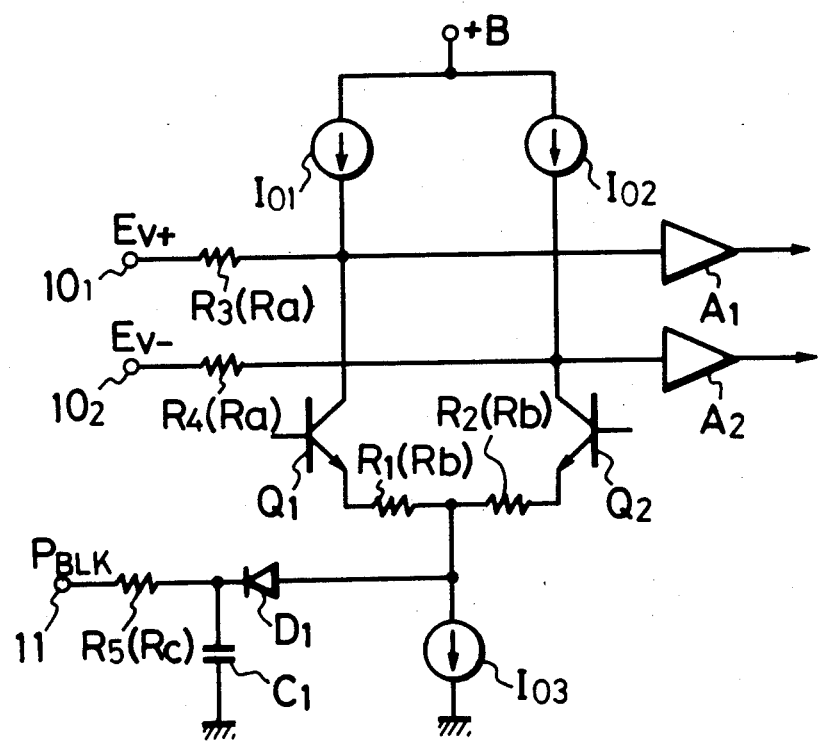
FIG. 7 is a connection diagram showing an example of a circuit for generating a deflection voltage used in this invention.

In FIG. 7, reference numerals $Q_1$ and $Q_2$ respectively designate npn-type transistors which are connected in differential manner. Constant current circuits $I_{01}$ and $I_{02}$ are respectively connected to the collectors thereof and the emitters of transistors $Q_1$ and $Q_2$ are connected together through resistors $R_1$ and $R_2$ each having a resistance value Rb and then grounded through a constant current source $I_{03}$. To terminals $10_1$ and $10_2$, there are respectively supplied saw-tooth wave voltages $E_{V+}$ and $E_{V-}$ for use in over-scan (shown in FIGS. 4A and 4B) as in the prior art example. These saw-tooth wave voltages $E_{V+}$ and $E_{V-}$ are delivered through resistors $R_3$ and $R_4$ each having a resistance value of Ra and buffer amplifiers $A_1$ and $A_2$, respectively. The connection point between the resistor $R_3$ and the buffer amplifier $A_1$ is connected to the collector of the transistor $Q_1$, while the connection point between the resistor $R_4$ and the buffer amplifier $A_2$ is connected to the collector of the transistor $Q_2$. Further, the connection point between the resistors $R_1$, $R_2$ and the constant current circuit $I_{03}$ is connected through a series circuit formed of a diode $D_1$ and a resistor $R_5$ having a resistance value Rc to a terminal 11. The connection point between the diode $D_1$ and the resistor $R_5$ is grounded via a capacitor $C_1$. To the terminal 11, there is applied a pulse $P_{BLK}$ which is at a low level during the vertical blanking period $T_{BLK}$. In this case, the diode $D_1$ is turned on only during the vertical blanking period $T_{BLK}$. Accordingly, if the level of the pulse $P_{BLK}$ is taken as $E_{In}$, the effect thereof on the outputs of buffer amplifiers $A_1$ and $A_2$ is $$E_0 = \frac{Ra}{Rb + Rc} \cdot E_{IN}$$

Therefore, the outputs of the buffer amplifiers $A_1$ and $A_2$ are the saw-tooth wave voltages $E_{V+}$ and $E_{V-}$ with their average values $V_{GW}$ lowered by $\Delta E_V$, i.e., $E_0$ during the vertical blanking period $T_{BLK}$.

Although, in the example of FIG. 7 the capacitor $C_1$ is not necessary in principle, as a practical matter the waveform of the pulse $P_{BLK}$ must be blunted by the provision of this capacitor $C_1$. This is because, if the saw-tooth wave voltages $E_{V+}$ and $E_{V-}$ are displaced from each other phase, a voltage to be applied between the deflection electrodes $V_+$ and $V_-$ does not become the predetermined one by the displaced timing so that the deflection position will be displaced. However, if the waveform of the pulse $P_{BLK}$ is blunted, as by the capacitor $C_1$, the possibility of such displacement of the deflection position can be alleviated.

Further, in accordance with this embodiment, as compared with the saw-tooth wave voltages $E_{H+}$ and $E_{H-}$ for use in horizontal deflection (for over-scan) used in the prior art example, the average value $H_{GW}$ of the voltages $E_{H+}$ and $E_{H-}$ is lowered by a predetermined value $\Delta E_H$ (shown in FIGS. 6D and 6E) during the vertical blanking period $T_{BLK}$. Also such saw-tooth wave voltages $E_{H+}$ and $E_{H-}$ are generated by a circuit similar to that shown in FIG. 7.

Furthermore, in accordance with this embodiment, in order that the deflections of the electron beam Bm in the horizontal and vertical directions are carried out up to the mesh angle, the levels of the over-scan portions los of the saw-tooth wave voltages $E_{V+}$, $E_{V-}$, $E_{H+}$, $E_{H-}$ are pre-determined.

Figure 1:
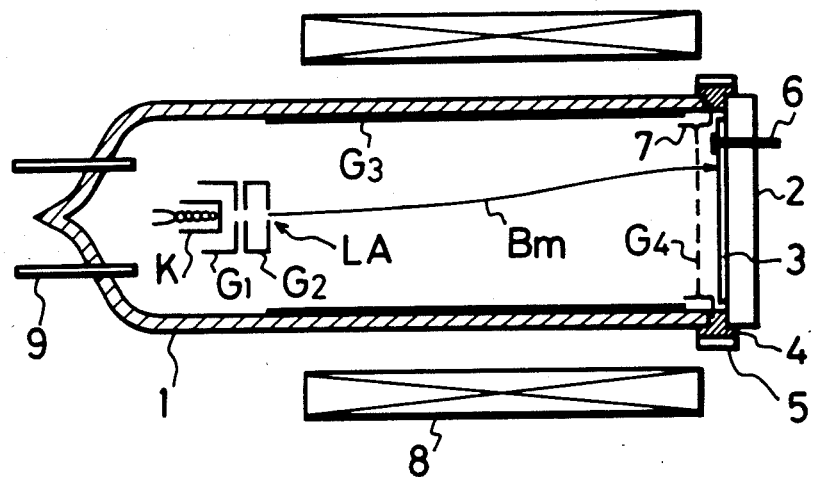
FIG. 1 is a cross-section view showing an example of a prior art electromagnetic focusing and electrostatic deflection type image pick-up tube.
Figure 2:
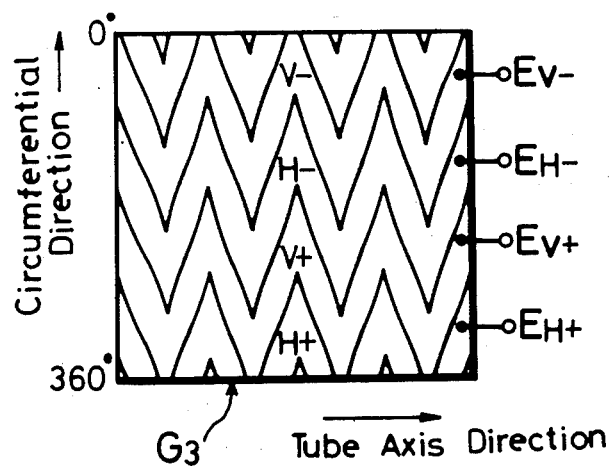
FIG. 2 is a diagram showing a pattern of an electrode of the image pick-up tube of FIG. 1

It is to be noted that, in the image pick-up tube of the type shown in FIG. 1, the focussing state of the electron beam Bm is determined by the magnetic field generated by the focusing coil 8 and the central potential of the deflection electrode $G_3$. When scanning in the effective image area 3A, the above magnetic field and the central potential are both determined so as to establish the just focusing state.

Figure 5:
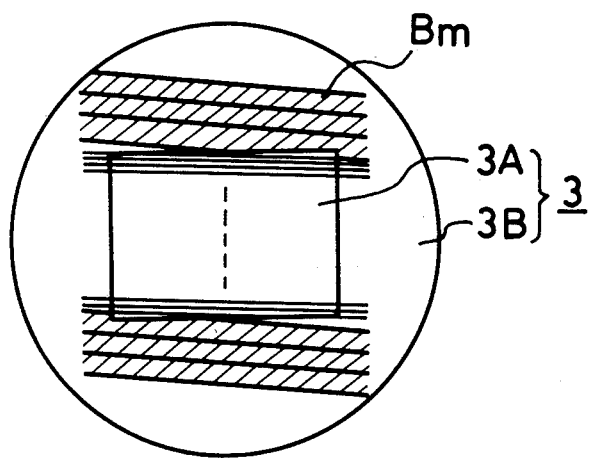
FIG. 5 is a diagram showing scanning loci of an electron beam in an embodiment of the present invention.

Since the apparatus according to this embodiment is arranged as described above and the average potential among the voltages $E_{V+}$ to $E_{H-}$, i.e., the central potential of the electrode $G_3$, is lowered during the vertical blanking period $T_{BLK}$ in which the over-scan is carried out by the rough scanning of the electron beam Bm, the landing spot of the electron beam Bm on the target screen 3 is defocused during that period $T_{BLK}$. Accordingly, as shown by the scanning loci thereof in FIG. 5, the defocused beam scans relatively wide paths in the over-scan portion, as shown by hatched areas, so that substantially all of the over-scan area is scanned by the electron beam Bm.

Therefore, in the above described embodiment of the invention, the potential of the effective image area 3A and the potential of the over-scan area 3B near the periphery of the effective image area 3A become nearly uniform so that it becomes possible to considerably reduce the occurrence of the framing and to avoid the false signal caused by the secondary beam reflection.

Furthermore, in the described embodiment, since the deflections of the electron beam Bm in the horizontal and vertical directions are carried out up to the mesh angle, it becomes possible to more positively reduce the false signal caused by the secondary beam reflection.

While in the above-described embodiment the average potentials of the saw-tooth voltages $E_{V+}$ to $E_{H-}$ are shown as being lowered only during the vertical blanking period $T_{BLK}$, it is to be understood that the above-described operation can be carried out during the horizontal blanking period in the same way.

While in the above-described embodiment the over-scan is carried out in both the vertical and horizontal directions, the present invention can be applied to a case in which the over-scan is carried out only in one of the vertical and horizontal directions.

Furthermore, while in the above-described embodiment the present invention is applied to an image pick-up tube of the type employing electromagnetic focusing and electrostatic deflection, the present invention can similarly be applied to an image pick-up tube of the type having electrostatic focusing and electrostatic deflection.

As set forth above, according to this invention, even if the scanning is carried out roughly by the electron beam in the over-scan portion, almost all of the over-scan area can be scanned by the electron beam and hence the potential at the effective image area and the potential at the over-scan area can be made substantially uniform. Consequently, according to this invention, the effect by the over-scan can be demonstrated sufficiently and the effect for reducing the occurrence of the framing and for avoiding the false signal caused by the secondary beam reflection can be improved.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. An apparatus for controlling the deflection of an electron beam in an image pick-up tube of the type including a target having a portion constituting a raster image area, an electron gun for generating the electron beam, deflection means for use in causing the generated electron beam to scan said target in accordance with a deflection signal, and means for focusing said generated electron beam at said target and being influenced by said deflection signal, said apparatus further comprising:

means for generating a periodic saw-tooth waveform signal having a first portion of each period adapted for causing said beam to scan said raster image area on said target at a first scan velocity and a second portion of each period for causing said beam to scan an over-scan area on said target located outside of said raster image area at a second scan velocity faster than said first scan velocity;

average signal level changing means operative during scanning of said over-scan area for changing the average signal level of the second portion of said saw-tooth waveform signal relative to the average signal level of the first portion of said saw-tooth waveform signal; and means for supplying the output of said average signal level changing means to said deflection means as said deflection signal therefor, said average signal level of the first portion of said saw-tooth waveform signal being such as to achieve focusing of said electron beam at said target when scanning said raster image area, while the changed average signal level of said second portion of the saw-tooth waveform signal is such as to defocus the electron beam when scanning said over-scan area of said target.

2. Apparatus according to claim 1, wherein said second portion of said saw-tooth waveform signal occurs within a blanking interval of the deflection signal.

3. Apparatus according to claim 2, wherein said means for generating the periodic saw-tooth waveform signal generates a pair of saw-tooth waveforms with mutual opposite polarity, and said deflection means include a pair of deflection plates connected to be supplied with respective outputs of said average signal level changing means.

4. Apparatus according to claim 3, wherein said average signal level changing means includes a differential amplifier having a pair of transistors, emitters of which are connected together and to a reference voltage source through a current source, said pair of the saw-tooth waveforms from said means for generating are supplied to collectors of said pair of transistors through respective impedance devices and a switching circuit is connected to the common emitter connection point and is made conductive during the blanking interval of the deflection signal for increasing an output current from said differential amplifier on conduction thereof.

5. Apparatus according to claim 4, wherein said switching circuit includes a series circuit of a diode and a resistor and said resistor is connected to receive a blanking pulse so that said diode is conductive during the blanking interval of the deflection signal.

6. Apparatus according to claim 5, wherein said switching circuit further includes a capacitor connected to the connection point between said resistor and the diode.

* * * * *